UNITED STATES PATENT OFFICE.

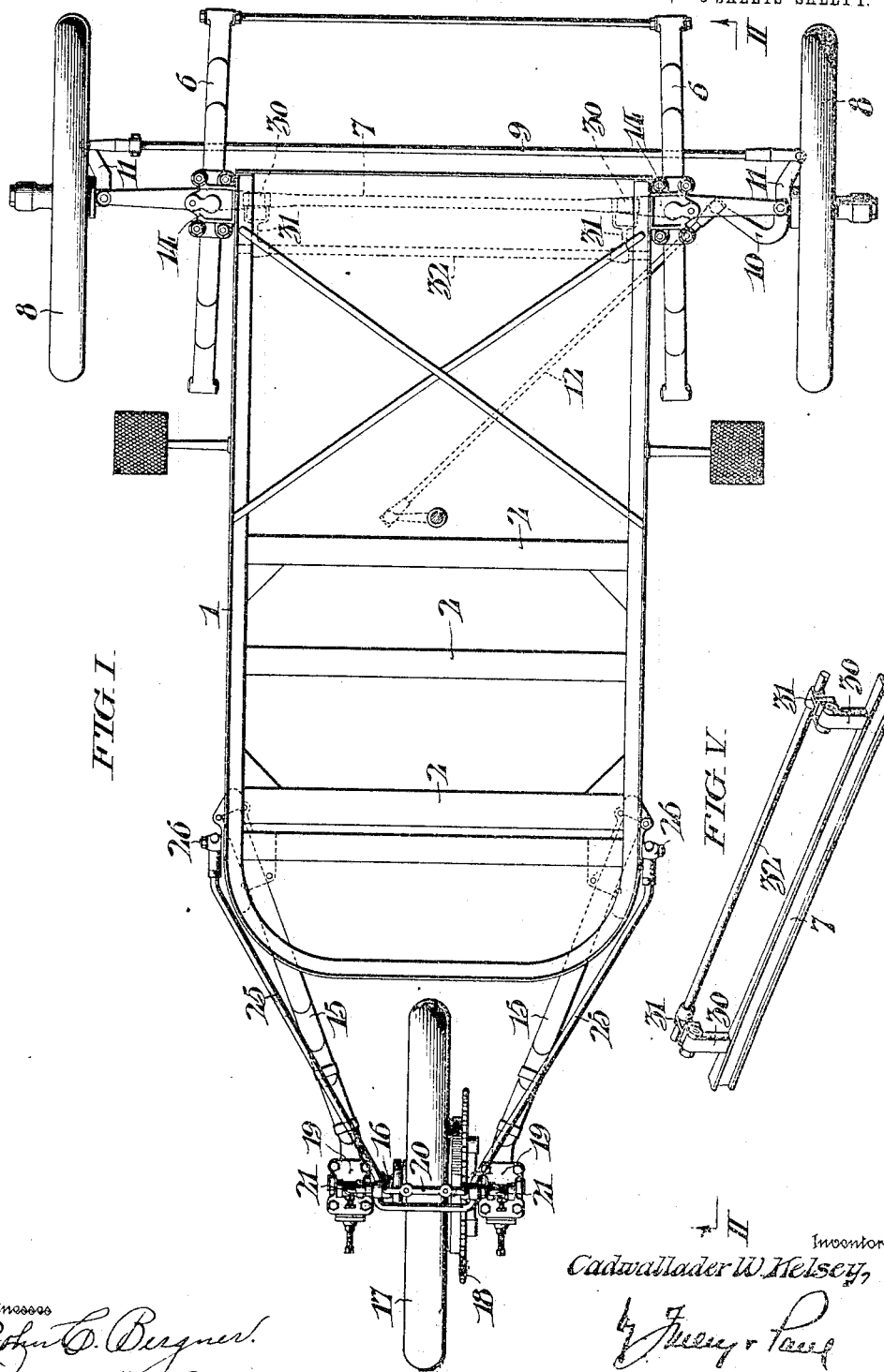

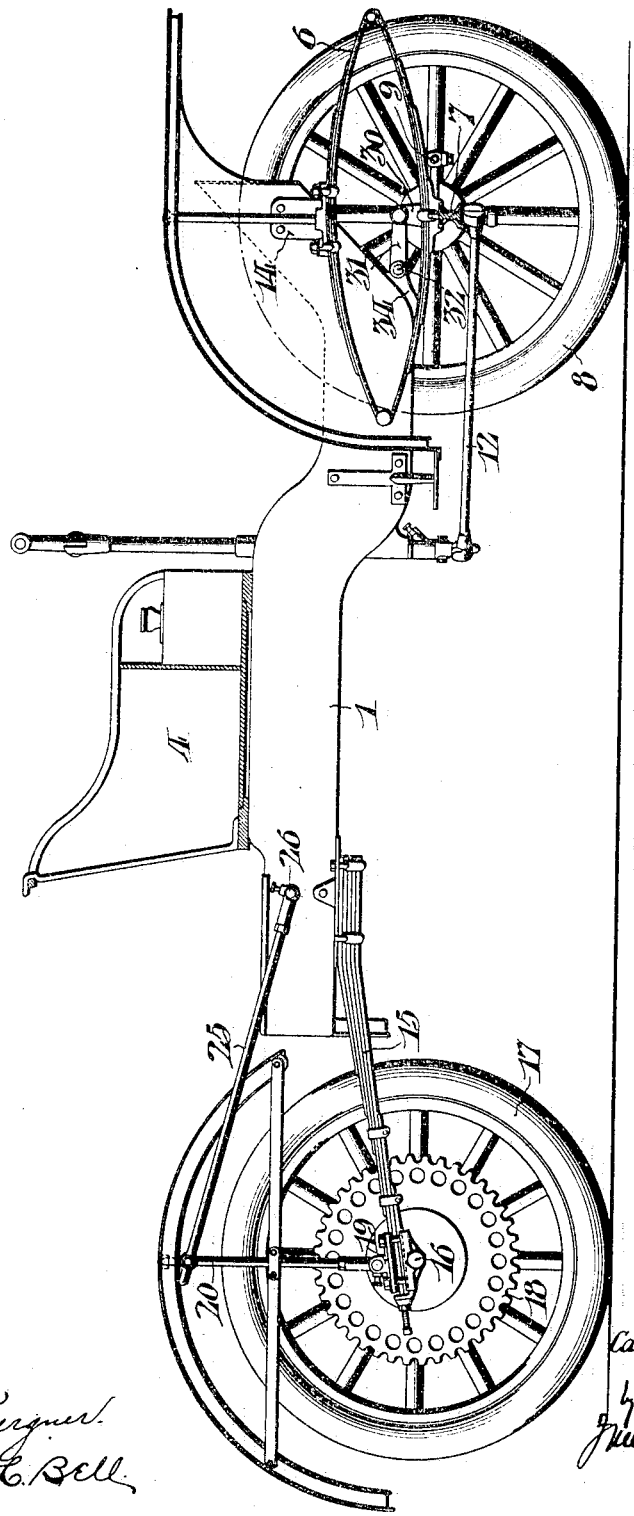

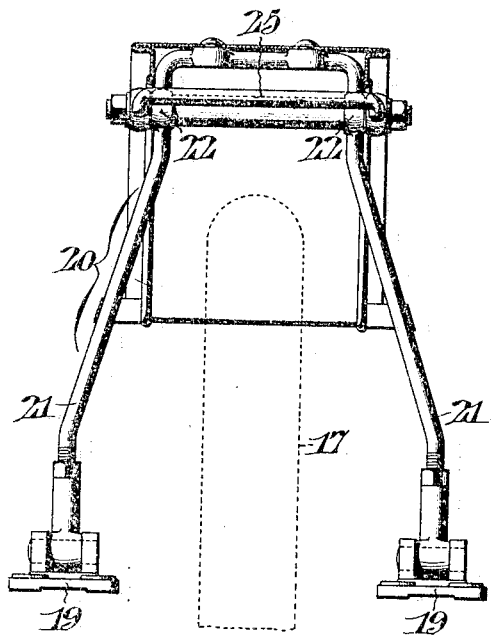
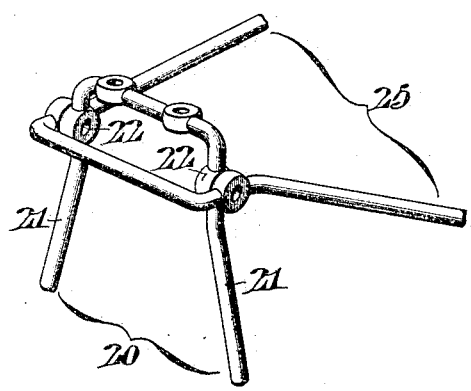

CADWALLADER W. KELSEY, OF HARTFORD, CONNECTICUT.

MOTOR-VEHICLE SUSPENSION.

1,121,256.  Specification of Letters Patent.  Patented Dec. 15, 1914.

Application filed July 1, 1911. Serial No. 636,466.

*To all whom it may concern:*

Be it known that I, CADWALLADER W. KELSEY, of Hartford, in the county of Hartford and State of Connecticut, have invented certain new and useful Improvements in Motor-Vehicle Suspension, whereof the following is a specification, reference being had to the accompanying drawings.

My invention relates to a frame structure or suspension device particularly adapted for use with motor-driven vehicles. The embodiment of the invention which has been selected for illustration and description is a three-wheeled motor vehicle, the two front wheels being the steering wheels and the rear wheel the driving wheel.

The invention relates particularly to the spring suspension of the vehicle body or frame between the two axles, and to the means for providing against the distortion of the suspension device.

As will be readily understood, the invention in some particulars is adaptable for use in other types of vehicles than the construction herein illustrated.

The invention will be described with reference to the embodiment illustrated, but with the clear understanding that its use is not limited to this particular embodiment, and that the claims are intended to cover modifications of or alterations in the arrangement of the parts making up the structure.

An embodiment of my invention is shown in the accompanying drawings, in which—

Figure I, is a plan view of such a motor vehicle, the seat and all parts related to the motive power being removed. Fig. II, is a side elevation of the same partially in section. Figs. III, and IV, are detailed views of the rear stabilizer. Fig. V, is a detail view of the front stabilizer.

The car body consists of a U-shaped frame 1, united by cross braces 2, 2, 2, with its sides dipping near the end to form the support for the foot board. The seat 4, is broad enough for two, and is carried upon the frame, as shown in the drawings. The forward end of the frame is supported by double elliptical springs 6, which rest upon the forward axle 7. This is accomplished by the brackets 14, 14, clamped directly to the sides of the frame and having their horizontal components resting upon and clamped to the upper surfaces of the spring. At the ends of the forward axle are pivoted the wheels 8, 8, held in parallelism by the arms 11, 11, and rod 9, and swung from side to side by the bell crank lever 10, controlled from a steering shaft by means of a connecting link 12. From the rear of the frame project two converging leaf springs 15, 15. These are bolted to the lower edge of the frame, one near either rear corner and converge as shown in Fig. I, to form the bearings for the rear axle 16, carrying the rear wheel 17, and also a sprocket wheel 18, by which the vehicle is driven.

I will now describe the equilibration devices or stabilizers by which the horizontal motion of the vehicle body is secured. The rear stabilizer comprises an upright yoke frame 20, with rigid arms and cross-piece, which is pivoted at the lower extremities of its two arms 21, with horizontal pivots, one to each of the clamping plates 19, by which the springs are made fast to the bearings for the rear axle. A short distance below its cross piece the yoke frame is flattened to provide horizontal pivot bearings 22. A second yoke frame 25, more or less horizontal in position, is similarly provided with companion pivotal bearings so as to afford means for pivoting the two yoke frames together, subject to the restraint of the horizontal pivots. The extremities of the arms of this second yoke frame are pivoted one at either side of the vehicle frame by means of horizontal pivots 26. With this device, the depression of either bearing point on the rear axle compels a coincident depression of its fellow.

The forward stabilizer which is shown in detail in Fig. V, comprises two uprights 30, fast upon forward axle one near either extremity. To each of these is pivoted with horizontal pivots an arm 31, fixed upon a connecting rod or rock shaft 32. This rock shaft is set to rock in bearings 34, upon either side of the vehicle frame. By this device a depression of one side of the forward axle compels a corresponding depression of the other side and also the motion of the vehicle frame upon the springs is held to the horizontal plane.

Having thus described my invention, I claim:

1. A motor vehicle including a frame, a pair of rearwardly extending spaced leaf springs rigidly connected to said frame and located on opposite sides of the wheel, a shackle connected to the free end of each spring, rigid means for connecting said shackles, a rearwardly projecting fork pivotally connected to said frame, and means for pivotally connecting its free end to said shackle-connecting means.

2. In a vehicle, the combination with a frame and a wheel with its shaft, of resilient members extending laterally from said frame to each side of said wheel at one level, rigid members pivotally-connected with said frame at one end and extending to each side of said wheel at another level, and a rigid yoke connecting the ends of said springs and pivotally-connected with the ends of said rigid members.

3. In a vehicle, the combination with a frame and a wheel with its shaft, of resilient members extending laterally from said frame to each side of said wheel at one level, rigid members pivotally-connected with said frame at one end and extending to each side of said wheel at another level, and a rigid yoke pivotally-connected to the ends of said resilient members and rigid members.

4. In a vehicle, the combination of the vehicle frame; a rear axle carrying a single wheel; resilient connections attached to the vehicle frame and reaching to both sides of the wheel; a yoke passing from one side of the wheel to the other, pivotally connected to said resilient connections, and a complementary yoke pivotally connected at one end to the first named yoke and at its other end to the vehicle frame.

5. A vehicle wheel suspension including in combination an axle, brackets attached to said axle adjacent each end thereof, a vehicle body, a pair of resilient members secured to the body and projecting to each side of said wheel, a pair of rigid members secured to said body and projecting to each side of said wheel, the members of one of said pairs being connected with said brackets, the members of one of said pairs being pivotally-connected with said body, and a rigid yoke pivotally-connected with said brackets and with the members of one of said pairs.

6. A vehicle wheel including in combination an axle; a vehicle wheel mounted intermediate the ends of the axle; brackets secured to the ends of the axle; a vehicle body; springs secured at each side of the vehicle body and attached to said brackets; a rigid frame pivoted to said brackets; and means connected to said rigid frame at the upper part thereof for holding the same in substantially fixed vertical position relative to the vehicle body.

7. A vehicle including in combination an axle; a vehicle wheel mounted intermediate the ends of the axle; brackets attached to the ends of the axle; a vehicle body; springs connected with the vehicle body and rigidly connected to the brackets; a rigid frame pivotally connected to the brackets, extending to a point above the wheel; rods pivotally connected to the frame, and pivotally connected to the vehicle body.

8. A three-wheeled motor vehicle comprising a frame; a forward axle with two steering wheels, and a rear axle with one driving wheel; bearings one on either side of said driving wheel for the rear axle; spring suspension interposed between the frame and the forward axle; and converging leaf springs projecting from the rear of the frame and converging toward and attached to the bearings of the rear axle.

9. A three-wheeled motor vehicle comprising a frame; a forward axle with two steering wheels, and a rear axle with one driving wheel: spring suspension interposed between the frame and the axles in combination with a rear stabilizer comprising a yoke with its arms horizontally pivoted one on either side of the rear axle, and pivoted connections between this yoke and the vehicle frame whereby its movement is controlled to maintain the horizontal position of the rear axle.

10. A three-wheeled motor vehicle comprising a frame; a forward axle with two steering wheels, and a rear axle with one driving wheel; spring suspension interposed between the frame and the axles in combination with stabilizers for both axles, each comprising a horizontal cross-piece with means for maintaining its horizontality in relation to the frame; and arms in rigid relation to the cross-piece with horizontal pivotal connection at both sides of the axle.

11. The combination with a vehicle frame, of a pair of rearwardly-extending spaced leaf springs arranged in the same horizontal plane and located on opposite sides of the wheel, an arched yoke straddling the wheel and connecting the free ends of said springs, and a pair of rigid members pivotally-connected to the frame and said yoke.

12. A truss suspension for the rear wheel of motor vehicles comprising identical frame structures arranged at opposite sides of the wheel, each frame consisting of oppositely arranged resilient and rigid members projecting rearwardly from the vehicle frame and the latter pivotally connected thereto, rigid connectors between and jointed to the free ends of said resilient and rigid members, and transverse members connected between the upper and lower rear corners of said frames.

13. A supporting frame for one end of a motor vehicle consisting of a pair of spaced frame structures vertically arranged and located on opposite sides of the wheel, and each comprising upper and lower horizontal members, one of which is a leaf spring attached at its front end to the vehicle frame, and the other rigid and jointed to the vehicle frame, and a rear member connected to the ends of the upper and lower members and pivotally connected to the said rigid member.

14. A supporting frame for one end of a motor vehicle consisting of a pair of spaced frame structures vertically-arranged and each comprising upper and lower horizontal members, one of which is a spring rigidly attached at its front end to said vehicle frame, and the other rigid and jointed to said vehicle frame, and a rear member connected to the ends of the upper and lower members and pivotally connected to the said rigid member, and rigid means extending between the said structures and connecting the upper and lower rear corners thereof.

In testimony whereof, I have hereunto signed my name at Philadelphia, Pennsylvania, this twenty-ninth day of June 1911.

CADWALLADER W. KELSEY.

Witnesses:
JAMES H. BELL,
E. L. FULLERTON.